Jan. 23, 1968 K. CHANG ETAL 3,365,712

DIGITALLY CONTROLLED ATTENUATOR

Filed April 24, 1964 2 Sheets-Sheet 1

INVENTORS
KARL CHANG
JACK B. DENNIS
BY
Edward D. Thomas
AGENT

DIGITALLY CONTROLLED ATTENUATOR

Filed April 24, 1964 2 Sheets-Sheet 2

INVENTORS
KARL CHANG
JACK B. DENNIS
BY Edward D. Thomas
AGENT

United States Patent Office 3,365,712
Patented Jan. 23, 1968

3,365,712
DIGITALLY CONTROLLED ATTENUATOR

Karl Chang, Cambridge, and Jack B. Dennis, Belmont, Mass., assignors to Massachusetts Institute of Technology, Cambridge, Mass., a corporation of Massachusetts Filed Apr. 24, 1964, Ser. No. 362,288
5 Claims. (Cl. 340—347)

The present invention is related to wide range digitally controlled logarithmic attenuators and more particularly to an electrical attenuator in the form of a cascade of switched sections in which the attenuation of each section is switched in or out in response to a binary rgister which contains the desired attenuation in decibel form.

At present, wide dynamic range signal processing systems usually employ linear attenuation laders to convert between analog and digital signals. In such systems, the digital information is a binary number corresponding to the analog signal. Digitally controlled attenuators, for example, are used to accept a magnitude in terms of the several digits of a digital number representation and present it as the magnitude of a single quantity representing the number in analog fashion. Digitally controlled attenuators are also used in analog computers and servomechanisms as reference elements and as electrically variable control elements.

In both such uses of digitally controlled attenuators, there is a discrete amplitude-independent quantizing error caused by the limited number of possible positions the digitally controlled attenuator can occupy. Although the error can be reduced by using additional switching elements, a small percentage error is still produced for large signals and a large percentage error for small signals. Attempts have been made to alleviate this problem by compressing the analog signal before converting to a digital signal or by expanding the analog signal after conversion from a digital signal. However, the inherent hysteresis and poor impedance match of the compression and expansion circuits produce intolerable distortion.

It is desired to keep the quantizing error proportional to the signal amplitude without introducing signal distortion. In audio and video systems, frequently the tolerable error is kept proportional to signal amplitude while using is, therefore, an object of this invention to provide a wide range digitally controlled attenuator in which the error is kept proportional to signal amplitude while using a minimum number of switching elements by using cascaded stages at equal decibel intervals.

It is a further object of this invention to provide such an attenuator which is compatible with present digital and analog equipment, such as standard digital voltmeters often used for readout in decibels with fixed and floating digital computer systems.

It is also an object of this invention to provide a wideband, direct current logarithmically variable digital attenuator with low transient noise and minimal distortion. A further object of the invention is to provide such an attenuator responsive to input signals varying in frequency from D.C. through video frequencies with minimum drift and phase shift.

A preferred embodiment of the invention takes the form of a cascade of switched stages employing transistor switches with resistive voltage dividers as the basic element of attenuation. Each stage has two states—attenuating and non-attenuating. The attenuation for each stage when "on" is an integral power of two decibels independent of the state of the other stages. By cascading these stages, the total attenuation is simply the sum in decibels of the attenuation of each stage. A unity gain buffer amplifier is used to isolate successive stages.

Other objects, aspects and advantages of the invention will be in part pointed out, and in part apparent, from the following description considered together with the accompanying drawings in which.

Figure 1A:
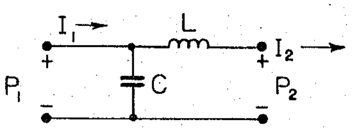
FIGURES 1A and 1B are schematic diagrams representing the electrical analog of a short lossless section of transmission line.

Referring to FIGURE 1A, a single section of an artificial line is shown in which the circuit configuration can be described by the relationship $$P_1=\frac{I_1-I_2}{j\omega C_1} \text{ and } I_2=\frac{P^1-P_1}{j\omega L}$$

Figure 1B:
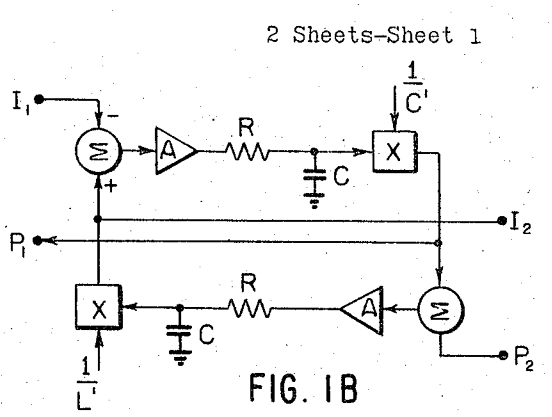

In FIGURE 1B, a single line section is shown by its representation in analog components using differential amplifiers, integrators and multipliers. In FIGURE 1B, both integrations are performed by simple RC circuits followed by differential amplifiers such that $$\frac{1}{j\omega C_1}=\frac{A}{C'RCj\omega} \text{ and } \frac{1}{j\omega L}=\frac{A}{L'RCj\omega}$$

Here $1/C'$ and $1/L'$ represent step attentuators which are to be controlled by digital signals.

The board and general use of lumped parameter artificial line sections for dynamic analog computer use as well as for the simulation of many physical phenomena is common practice.

Figure 2:
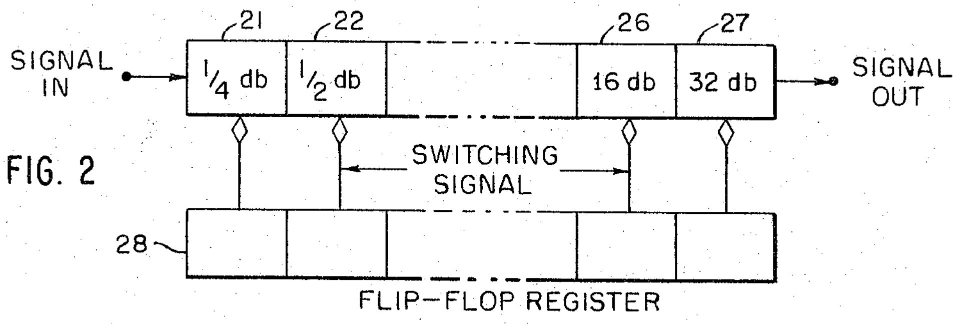
FIGURE 2 is a schematic diagram of the basic circuit.

FIGURE 2 represents the basic concept of a cascade of switched sections 21, 22—26, 27 having individual attenuations of ¼ db, ½ db—16 db and 32 db respectively. The attenuation of each individual section is switched in or out by one flip-flop of register 28 which contains the desired attenuation in binary data form.

Figure 3:
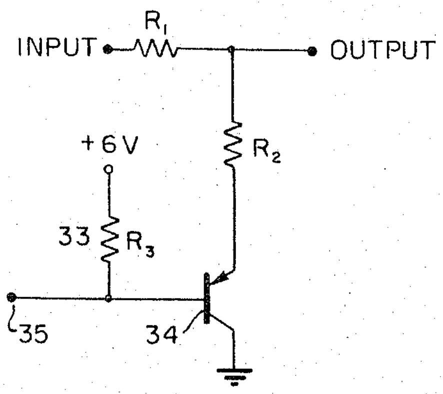
FIGURE 3 is the schematic diagram of the preferred transistor switch circuit.

A simplified attenuator section is shown in FIGURE 3. The transistor switch circuit is operated with the collector of transistor 34 grounded in order to reduce the difference in D.C. output between the on and off states. When there is no drive voltage applied to terminal 35 the base is brought to plus 6 volts through resistor 33 reverse biasing both junctions. There is then a very high impedance from emitter to ground. This is the "off" state of the switch. As long as the input voltage does not exceed the bias voltage, the above statement is true. If the input voltage exceeds the bias voltage, distortion results because the emitter junction becomes forward biased.

When drive current is applied to terminal 35 to forward bias transistor 34, the transistor saturates. There is then a very low impedance from emitter to ground. This is the "on" state of the switch. Although the impedance is low, it is not zero, so the attenuation of the circuit is $$\frac{R_2+R_s}{R_1+R_2+R_s}$$

where $R_s$ is the saturation resistance of transistor. Therefore, $R_s$ should be made as low as possible to approach the ideal attenuation ratio $$\frac{R_2}{R_1+R_2}$$

and to minimize variations in attenuation with variations in $R_s$. $R_s$ is also non-liner and produces distortion which is mononically related to the ratio of signal current to switching current. This ratio should be made as small as possible, requiring a large drive current and/or as small signal current.

The noise introduced by the transistor switch is of four kinds. Three of these are caused by circuit deficiencies and one by the step nature of the attenuation. This last is simply the modulation products caused by modulating the signal with a step or a series of steps. The amplitude of these modulation products is directly proportional to the amplitude of the step and the signal amplitude. The ¼ db steps used in the present embodiment cause the modulation products to be inaudible with complex signals such as speech. With simpler signals such as sine wave, however, they are audible.

A second kind of noise results from the different delays in the switching of various stages of the complete attenuator. For example, if, when switching from 31¾ db to 32 db, the 32 db stage is slower or faster than the other stages, the attenuation will momentarily be 0 db or 64 db. The effect is that of modulating the signal with a rather large narrow pulse. This can best be minimized by keeping all switching delays as small as possible. The major source of delay is the time required for the switching transistor to come out of saturation. Since this time is directly proportional to the drive current, this type of noise is reduced by minimum drive current.

A third kind of noise is caused by capacitive coupling of the driving signal from base to emitter of the transistor switch. The energy of the noise pulse so generated is equal to the product of the charge that flows from the emitter and the resistance of the voltage divider. The amount of charge is rather complexly related to the voltage swing at the base, the drive current, and the transition and diffusion capacitances of the emitter junction. To reduce noise of this kind the above four items should be minimized. Reduction of the base voltage swing requires that the signal swing be correspondingly reduced and hence a minimum drive current is indicated.

A fourth kind of noise is caused by the change in D.C. level at the emitter between the on and off states. This kind of noise is reduced by using minimum drive current and minimizing the resistance of the voltage divider.

In a simple attenuator section as shown in FIGURE 3, the source impedance is assumed very low and the load impedance is very high to provide ideal attenuation of $$\frac{R_2}{R_1+R_2}$$

Figure 4:
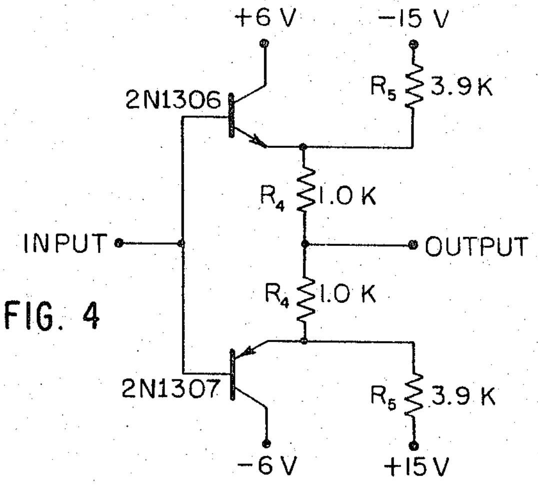
FIGURE 4 is the schematic diagram of the transistor buffer amplifier.

In order to match impedance levels and to isolate the noise effects, a unity gain buffer amplifier is provided. Although a single transistor amplifier can be used, some means of cancelling the base-emitter voltage drop must be devised, otherwise the D.C. output will be chopped by the following attenuator stages and considerable noise will be produced. However, it is nearly impossible to cancel the drop for all temperatures because of its large variation with temperature. Consequently, two class A complementary emitter followers are used as shown in FIGURE 4. By using matched transistors, the base-emitter voltage drops very nearly cancel each other for all temperatures. A drift of less than 1 mv. can be achieved over a wide temperature range. Most of the drift has been found due to differential cooling of the two transistors. The effect of differential cooling can be minimized by lowering the total cooling by limiting the power dissipation. In order to do this, the bias current must be kept small and this in turn reduces the maximum permissable signal current.

D.C. coupling is required in order to eliminate low frequency phase shift. The analog LC representation places the attenuator in a high gain feedback loop and excessive phase shift could produce disastrous oscillations.

The output impedance of the buffer amplifier is very nearly $R_4/2$ which serves as $R_1$ of FIGURE 3.

It will be noted that the various noise and stability effects have conflicting circuit requirements. For example, to minimize the capacitively coupled noise requires a small $R_1$ and a small drive current. A small $R_1$ in turn requires high bias currents in the emitter followers yielding greater drift and also producing greater signal currents and more distortion. Further small drive currents also tends to increase distortion. Therefore, the final circuit, such as FIGURE 5, represents a particular compromise of the conflicting requirements.

Figure 5:
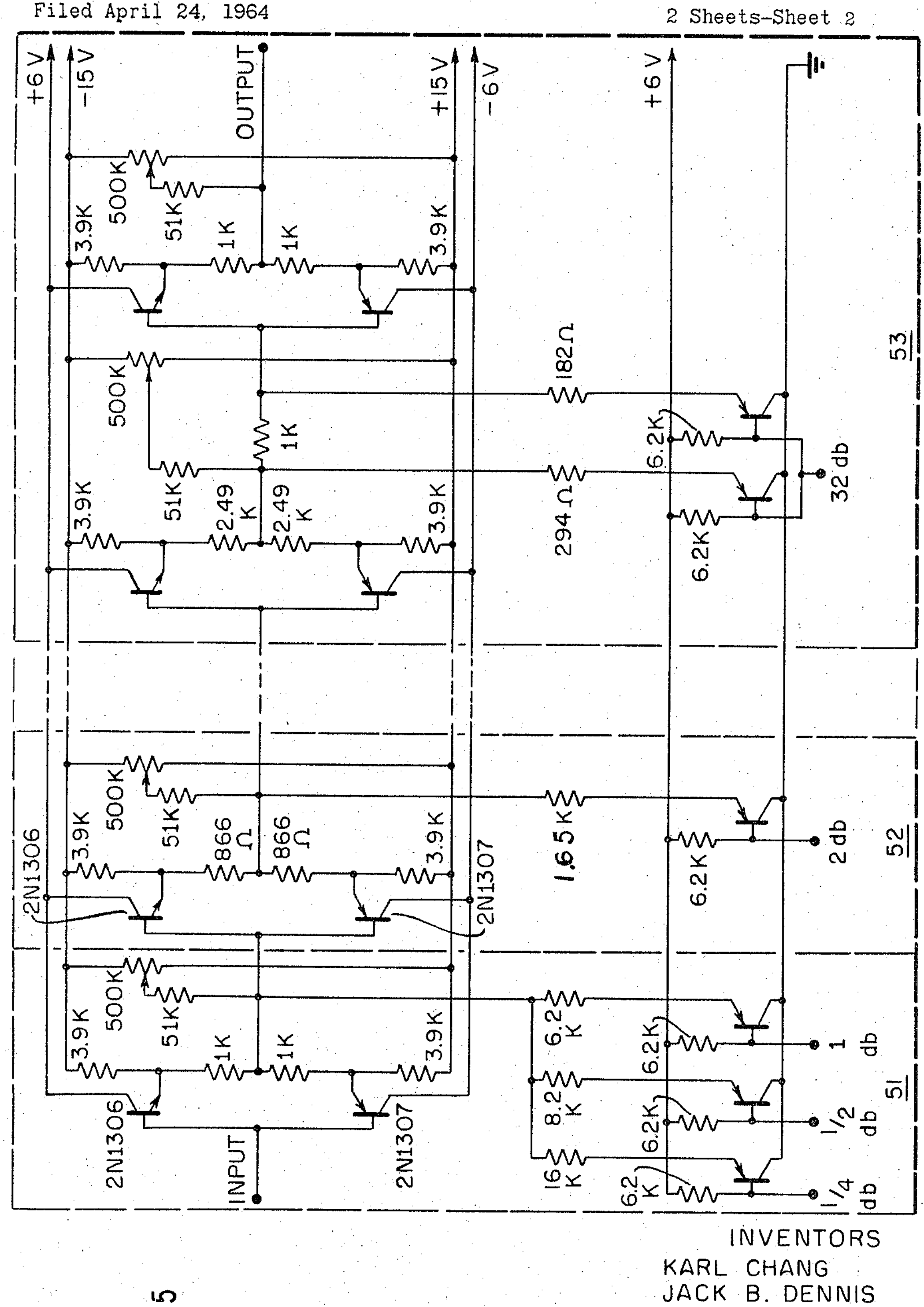
FIGURE 5 is the circuit diagram of the complete multi-stage attenuator.

The operation of the circuit of FIGURE 5 is evident from the preceding discussion. We have found that the first three stages of the attenuator can be operated without intervening buffer amplifiers, as shown in block 51 of FIGURE 5. This is possible because the source impedance for one stage is not significantly altered by the state of the other two stages. Block 52 is illustrative of all the stages providing attenuations of 2 db, 4 db, 8 db, and 16 db and hence only the value of $R_2$ and $R_4$ differ from stage to stage as shown as follows:

| | 2 db | 4 db | 8 db | 16 db |
|---|---|---|---|---|
| $R_2$ | 1.65K | 1.07K | 0.634K | 0.232K |
| $R_4$ | 0.866K | 1.27K | 1.91K | 2.49K |

In block 53 the 32 db stage consists of two sections. This is done in order to maintain a reasonable size of resistance $R_2$ in order to reduce distortion and improve the accuracy of the stage.

In the foregoing discussion, it is assumed that the circuit drive from the flip-flop register of FIGURE 2 have sufficient voltage swing and power capability to switch the transistor switches of FIGURE 5. In the event that amplifiers are required to drive the switches from the flip-flop register, we have found that a grounded base amplifier configuration provides a gain independent drive without requiring saturation or clamping of the driving transistor.

Attention is directed to the use in each stage of a 500K potentiometer which has its variable arm connected through a series 51K resistor to the output of the stage in order to balance out slight variations in the D.C. level. This control aids in the reduction of the fourth kind of noise discussed earlier.

The circuit of FIGURE 5 was found to have: phase shift at 20 kc./s. of −4°, harmonic distortion at 5.5 volts peak input of 0.05%, maximum total drift at output from 20° C. to 30° C. ambient of 15 mv., input impedance of 180KΩ, output impedance 510Ω, minimum attenuation of 0.29 db.

Although the digitally controlled attenuator has been described in its preferred embodiment as particularly suited as a component in a digitally controlled section of electrical transmission line, it is readily apparent that the device is not limited to that particular purpose. In long distance audio or video transmissions by pulse-code modulation, the device of the present invention is suitable for service in a sucessive-approximation digital voltmeter. Here a sample-and-hold circuit transmits data to the voltmeter every 20–100 microseconds for audio frequencies or every 0.1 microsecond for video frequencies. Each logarithmic pulse train output is then sent through the transmitter in an error correcting code. The least significant bit of voltmeter output can be set to reduce audible distortion greatly. More broadly, the device is readily applied to the general purpose of digital to analog conversion.

A specific preferred embodiment of the invention has been set forth in detail. It is desired to emphasize that this is not intended to be exhaustive or limiting. On the contrary, the showing herein is for the purpose of illustrating one form of the invention and thus to enable others skilled in the art to adapt the invention in such ways as meet the requirements of particular applications, it being understood that various modifications may be made without departing from the scope of the invention as limited by the prior art.

What is claimed is:

1. An electrical circuit for providing variable attenuation between analog input and output signals as a function of a binary digital control signal comprising, a unity gain balanced complementary transistor emitter follower amplifier having high input impedance and low output impedance and a resistive voltage divider having its input terminals connected between the output of said amplifier and ground by a serially connected switching element providing at the output terminal of said divider a non-attenuating state when said switch is open and an attenuating state when closed, and means for operating said switching element to its open or closed state in accordance with the binary state of said control signal.

2. The attenuating circuit of claim 1 wherein said switching element is a grounded collector transistor biased to be normally non-conducting and wherein said means for operating said switching element includes means for forward biasing said transistor to saturation to obtain said attenuating state.

3. A digital to analog device for accepting a magnitude in terms of the several digits of a binary number and presenting it as the magnitude of a single quantity representing the number in analog fashion comprising, a register for storing the several digits of a binary number as electrical quantities, a plurality of switched stages, one for each digit of said binary number, each of said stages having a unity gain balanced complementary transistor emitter follower buffer amplifier providing high input impedance and low output impedance and a resistive voltage divider connected across said amplifier output through a serially connected switching element providing a non-attenuating state at the output terminal of said divider when said switching element is open and an attenuating state when closed, means for operating said switching elements in accordance with the electrical state of the respective digits stored in said register, and plurality of stages being arranged in a cascade whereby the total attenuation between its input and output is the sum of the individual attenuations offered by each of said stages.

4. An electrical circuit for providing variable attenuation in response to a binary digital control signal comprising, an isolation amplifier having high input impedance and low output impedance, a resistive voltage divider connected across the output of said amplifier by a serially connected switching element providing a non-attenuating state when said switch is open and an attenuating state when closed, and means for opening and closing said switching element in accordance with the binary state of said control signal.

5. An electrical circuit for providing variable attenuation between analog input and output signals as a function of a digital control signal comprising a plurality of stages, the attenuation of each being independent of the attenuation of any other stage, said plurality of stages being arranged in a cascade equal in number to the binary digits required to represent the total range of desired attenuation, each of said stages having an isolation amplifier providing high input impedance and low output impedance and a resistive voltage divider having its input terminals connected between the output of said amplifier and ground by a serially connected switching element providing a non-attenuating state at said divider output terminal when said switching element is open and an attenuating state at its output terminal when closed, said switching element including a grounded collector transistor switch, a register for storing said control signal in the form of the digits of a binary number, said register having a digit output for each digit stored therein, each switching element being responsive to the digit output of the register to which it is connected to be in the open condition for one binary state and in the closed condition for the other binary state.

References Cited

UNITED STATES PATENTS

| | | | |
|---|---|---|---|
| 2,323,626 | 7/1943 | Sheffield | 179—171 |
| 3,003,122 | 10/1961 | Gerhard | 332—9 |
| 3,014,211 | 12/1961 | Bussey | 340—347 |
| 3,204,187 | 8/1965 | Yashin | 328—105 |

OTHER REFERENCES

Hunter, Handbook of Semiconductor Electronics § 11–7 (2nd ed.).

MAYNARD R. WILBUR, *Primary Examiner.*

J. WALLACE, *Assistant Examiner.*